No. 821,681. PATENTED MAY 29, 1906.
J. L. VANDERMARK.
COMBINED STRAIGHT EDGE AND PAPER CUTTER.
APPLICATION FILED NOV. 28, 1902.
2 SHEETS—SHEET 2.
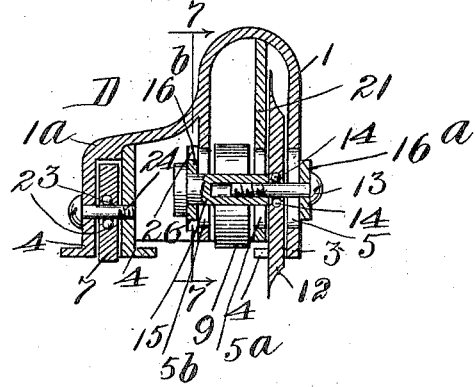
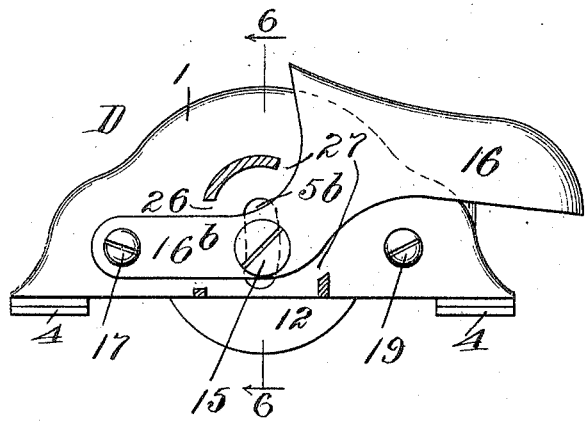

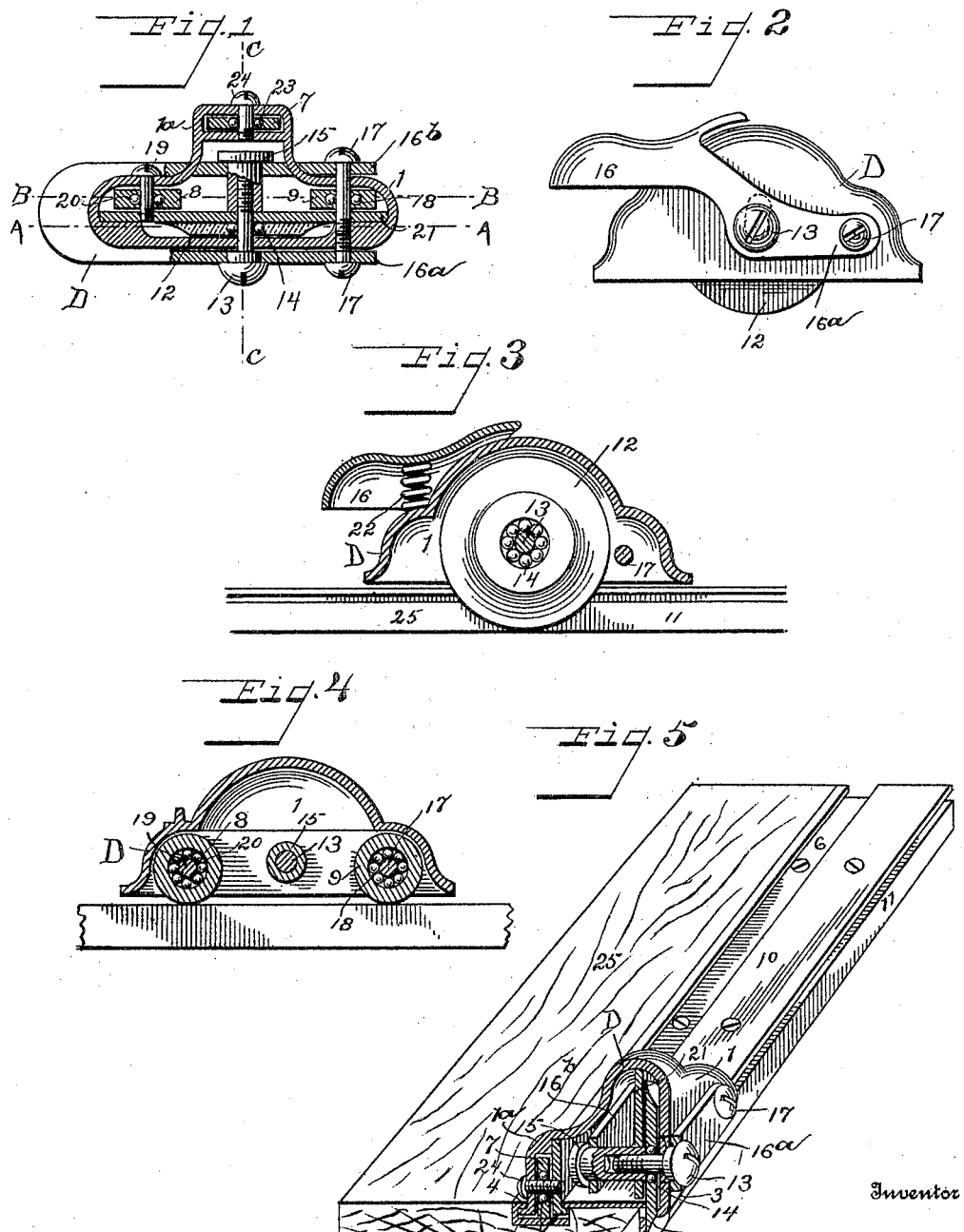

UNITED STATES PATENT OFFICE.

JOHN LORENZO VANDERMARK, OF CHICAGO, ILLINOIS, ASSIGNOR, BY MESNE ASSIGNMENTS, TO THE RIDGELY TRIMMER COMPANY, OF SPRINGFIELD, OHIO, A CORPORATION OF WEST VIRGINIA.

COMBINED STRAIGHT-EDGE AND PAPER-CUTTER.

No. 821,681.      Specification of Letters Patent.      Patented May 29, 1906.

Application filed November 28, 1902. Serial No. 133,155.

*To all whom it may concern:*

Be it known that I, JOHN LORENZO VANDERMARK, a citizen of the United States, residing at Chicago, in the county of Cook and State of Illinois, have invented a certain new and useful Improvement in Paper-Cutters, of which the following is a specification.

My invention relates to cutters or trimmers adapted for use in connection with a straight-edge for cutting or trimming wall-paper and the like, and particularly to cutters or trimmers for such purposes in which the frame or body of the device is provided with lugs or lips arranged to underlap flange portions on the straight-edge, so as to maintain it in sliding connection with the straight-edge and prevent it from lateral rock or tilt during use. As constructed prior to my invention, these cutters or trimmers have failed to work with desired ease, and their tendency to catch or adhere to the straight-edge to an extent to objectionably resist sliding movement along the same has in practice rendered it necessary to frequently soap or grease the way or track along which they are moved, and this is of course undesirable, as the presence of such lubricant is manifestly objectionable and its frequent application matter of extra labor.

Objects of my invention are to avoid all of such objectionable features, to permit the device to run easily and steadily along the straight-edge without the use of lubricant, to further insure against lateral tilt on the part of the cutting or trimming device, and to provide certain novel and useful details.

A further object is to provide a form of cutter which will make a clean cut through folded paper.

A further object of my invention is to provide a device which can be easily and cheaply constructed and which will be effective in operation.

In the accompanying drawings, Figure 1 is a section of my improved cutter or trimmer through Fig. 2 on a horizontal plane intersecting the axes of the pivots or gudgeons 13 and 17, said pivots being shown in bottom plan. Fig. 2 is a side elevation of the cutter or trimmer with the blade-carrying lever 16 depressed. Fig. 3 is a section through the cutter or trimmer on a vertical plane indicated by dotted line A A in Fig. 1. Fig. 4 is a like section on a plane indicated by line B B in Fig. 1. Fig. 5 is a cross-section through the cutter or trimmer on line C C in Fig. 1, the portion of the device shown back of the plane of the section being in perspective and in engagement with a straight-edge, of which latter a portion is illustrated. Fig. 6 is a transverse section which particularly shows slots 5 5$^a$ 5$^b$, through which the arbor extends. Fig. 7 is mainly a side elevation illustrating the side opposite that shown in Fig. 2, the laterally-projecting portion of the gage or shell being in section, so as to show the space afforded for one of the arms of the main frame or lever 16.

The body of my improved cutter or trimmer consists of an oblong shell or casing formed with opposite parallel side portions and having at one of such sides a lateral extension portion.

The cutting-disk is arranged within the shell or casing D and carried by the arms of a yoke-shaped lever 16. These arms of the yoke-shaped lever provide bearings for a spindle 13, upon which the cutting-disk revolves, and preferably antifriction-balls 14 are arranged between the spindle and the cutting-disk to reduce friction. The arms of the yoke-shaped lever are arranged opposite the outer faces of the side portions 1 of the casing, with one of such arms passing through suitable slots or openings 5 5$^b$, Fig. 6, in the lateral extension of the casing. These arms of the yoke-shaped lever are pivoted at their ends to the casing, screws 17 being conveniently provided for such purpose. The cutting-disk is normally raised by a spring 22, arranged between the casing and the free end of the yoke-shaped lever which is formed so as to practically conceal the spring. The casing is adapted to engage flanges 4 on a straight-edge 25, and to such end it is provided with lips 2, arranged to engage under such flanges.

In order to permit the cutter or trimmer to run easily along the straight-edge, it is provided with antifriction-rolls 8 and 9 at opposite sides of the axis of the cutting-disk and with an antifriction-roll 7 arranged within the lateral extension portion of the casing and having its axis in line with the axis of the cutting-disk. With such arrangement antifricton-balls 20 are arranged between the roll 8 and its spindle, and likewise antifriction-balls 18 are arranged between roll 9 and its spindle, and like balls 23 are arranged between the roll 7 and its spindle 24. The arrangement of antifriction-rolls at the three points described effectively supports and steadies the cutter or trimmer and prevents binding.

As illustrated in Fig. 5, the roll 7 in the lateral extension of the casing projects below the plane of the lugs or lips with which such lateral extension is provided, so that said roll will traverse the bottom of a longitudinal groove in the straight-edge 25, while the said lips or lugs on the lateral extension of the casing will engage under flanges overhanging such groove. The rolls 8 and 9 are, however, somewhat higher than the roll 7, so that they will run along the top face portion 10 of the straight-edge, said face portion being in the plane of the flanges which overhang the groove.

The cutting-disk 12 has one of its sides concaved back from the edge of the disk, as illustrated. With this form of cutting-disk the disk can be made to cut through folded paper on a line transversely through the fold without wrinkling the paper, it being seen that the disk has one flat side and an opposite side formed with annular transverse concavity, whereby the disk will have a comparatively wide and thin marginal cutting portion.

With further reference to the straight-edge I provide the bottom of its longitudinal groove with a metal strip or plate 2, which forms a way or bearing for one of the longitudinal grooves, and preferably this metal strip or plate is flanged along one longitudinal edge portion, so as to extend upwardly and then laterally inward to form one of the flanges under which a lip or lips of the cutting and trimming device may engage, as illustrated in Fig. 5.

With further reference to my improved device, the shell or body D is open along its bottom, so as to permit the cutting-disk to be lowered through such bottom by depressing the forked lever which straddles the shell or hollow body. During operation of cutting or trimming wall-paper or the like the lugs on the body D engage under flanges on the straight-edge, and when the cutting-disk is thus depressed and forced through the paper, which, as is well understood, lies on a table, the depression of the lever will necessarily depress the spring 22, which is confined between the handle end of the lever and an end portion of the body or shell. This action tends to cause the shell or body D to bind upon the straight-edge and also tends to tilt the shell or body, so as to cause the lugs or lug at one end thereof to bind against the under side of the flanges or flange on the straight-edge and also any lateral swerving on the part of the shell or body will also cause the lug or lugs on the body to bind against the flanges or flange on the straight-edge; but by employing antifriction-rolls distributed at points to overcome such objectionable features I am enabled to employ an easy-working device which will traverse the straight-edge without binding and avoid the frequent use of slippery matter commonly placed upon the straight-edge by paper-hangers for the purpose of insuring slip or slide on the part of the body of the trimmer.

The arm 16, which carries the cutting-disk 12, supports said disk by means of an arbor formed by the parts or gudgeons 13 15, which are shown adjustably screwed together, as in Figs. 1 and 5, the part or gudgeon 13 being screwed into the part or gudgeon 15. The part 15 of the arbor is shown attached to one arm of the lever 16, as best shown in Fig. 4, of the part 13, shown attached to the opposite arm of the lever.

In order to permit up-and-down movement of the lever 16, the sides of the shell or body 1 are provided with the slots 5 and $5^b$ for the arbor, and the partition 21, arranged within the hollow body, also has a slot $5^a$, as illustrated in Fig. 6, it being observed that in Fig. 5 the section of the partition 21 is on a plane back of the arbor, whereby said slot in this partition is not illustrated. These slots necessarily limit the up-and-down movement of the arm 16, with its arbor and cutting-disk. The shell or body 1 is also provided with lugs 2 and 3, which pass along under lips 4, as in Fig. 5, to prevent the device or cutting-tool from moving sidewise relatively to the straight-edge and also to prevent wabbling.

The device 16, which is in the nature of a pronged lever, may also be termed the "main frame," as broadly considered it is a frame, which carries the cutting-disk, and thus considered the shell D may also be termed a "gage," as it travels upon the straight-edge and is provided with slots 5 $5^a$ $5^b$, Fig. 6, which limit the vertical movement of the arbor for the cutting-disk.

What I claim as my invention is—

1. In a cutter or trimmer, the body consisting of a shell or casing having a lateral side extension; a lever provided with a cutting-disk which is arranged within the casing; antifriction-rolls arranged at opposite sides of the axis of the cutting-disk; and antifriction-rolls arranged at one side of the cutting-disk.

2. In a cutter or trimmer, a body having lips arranged to engage under flanges on a straight-edge; a yoke-lever provided with a cutting-disk and pivoted upon the body and antifriction-rolls attached to the body and arranged with two of such rolls respectively at opposite sides of the axis of the cutting-disk, and a third roll lower than said two rolls and opposite one side of the cutting-disk.

3. The combination of a cutter or trimmer having lips for engaging the under flanges on a straight-edge; and a groove with overhanging flanges, said groove being provided with a metal plate along its bottom, and the cutter or trimmer being provided with an antifriction-roll arranged to traverse said plate when a lip on the cutter or trimmer is in position to engage under a flange overhanging said groove in the straight-edge.

4. The combination with a straight-edge having a longitudinal groove and a metal plate extending along the bottom of said groove and flanged to form a ledge or flange overhanging the groove of a cutter or trimmer having a lip adapted to engage under said ledge or flange, and a roller arranged to bear on the metal plate along the bottom of the groove in the straight-edge.

5. In a cutter or trimmer, the body constructed with a shell open along the bottom and having lips for engaging a straight-edge; a fork-shaped lever arranged to straddle the shell and having its arms pivoted at one end of the latter and having its handle portion overhanging the opposite portion of the shell; a spring confined between the handle portion of the lever and the shell; and a cutter arranged within the shell and connected with the arms of the lever.

6. In a cutter or trimmer, the body constructed with a shell open along the bottom and having lips for engaging a straight-edge; a fork-shaped lever arranged to straddle the shell and having its arms pivoted at one end of the latter and having its handle portion overhanging the opposite portion of the shell; a spring confined between the handle portion of the lever and the shell; a cutter arranged within the shell and connected with the arms of the lever; and antifriction-rolls attached to the shell and distributed to prevent the shell and its lugs from binding against the straight-edge.

7. In a paper-trimmer, a gage, slotted openings therein, a frame pivoted to and extending on opposite sides of said gage, a knife-carrying arbor secured to said frame and extending through the slotted openings in said gage, and a spring between said gage and frame, substantially as specified.

8. In a paper-trimmer, a gage, a frame pivoted thereto, a knife-carrying arbor extending through said gage, and having its opposite ends supported in said frame, and a slotted opening in said gage to permit the vertical swinging movement of said frame, substantially as specified.

9. In a cutting-tool, a gage provided with engaging parts for a straight-edge, a slotted opening in said gage, a frame pivoted to and inclosing said gage, a spring between said frame and gage, a knife-carrying arbor having its opposite ends secured in said frame, said arbor extending through the slotted openings of said gage, substantially as and for the purpose specified.

10. In a cutting-tool, a frame, an arbor secured thereto, a knife mounted on said arbor having engaging devices for a straight-edge, said gage being provided with slotted openings, said arbor being extended through said slotted openings and engaging with said frame on opposite sides of said gage, the upper ends of said slotted openings being adapted to form a stop for said arbor to limit the upper movement of said frame and knife, and a spring between said gage and frame, substantially as specified.

JOHN LORENZO VANDERMARK.

Witnesses:
N. CAMERON,
ELMER E. BALDWIN.